(12) United States Patent
Wigard et al.

(10) Patent No.: US 12,477,495 B2
(45) Date of Patent: Nov. 18, 2025

(54) SIGNALLING ENABLING TIMING ADVANCE EXCHANGE BETWEEN USER EQUIPMENT AND RADIO ACCESS NETWORK

(71) Applicant: Nokia Technologies Oy, Espoo (FI)

(72) Inventors: Jeroen Wigard, Aalborg (DK); Mads Lauridsen, Aalborg (DK); Ping Yuan, Beijing (CN)

(73) Assignee: Nokia Technologies Oy, Espoo (FI)

( * ) Notice: Subject to any disclaimer, the term of this patent is extended or adjusted under 35 U.S.C. 154(b) by 285 days.

(21) Appl. No.: 18/261,965

(22) PCT Filed: Mar. 29, 2021

(86) PCT No.: PCT/CN2021/083635
§ 371 (c)(1),
(2) Date: Jul. 18, 2023

(87) PCT Pub. No.: WO2022/204885
PCT Pub. Date: Oct. 6, 2022

(65) Prior Publication Data
US 2024/0089883 A1    Mar. 14, 2024

(51) Int. Cl.
*H04W 56/00* (2009.01)
(52) U.S. Cl.
CPC .............................. *H04W 56/0045* (2013.01)
(58) Field of Classification Search
CPC ..... H04L 1/1642; H04L 47/34; H04L 1/1607; H04W 28/06; H04W 28/082;
(Continued)

(56) References Cited

U.S. PATENT DOCUMENTS

2010/0289659 A1   11/2010   Verbil
2012/0014371 A1*   1/2012   Weng .................... H04J 3/0682
                                                          370/350
(Continued)

FOREIGN PATENT DOCUMENTS

CN        107959983 A     4/2018
CN        111357336 A     6/2020
(Continued)

OTHER PUBLICATIONS

Office action received for corresponding Chinese Patent Application No. 202180005586.9, dated May 20, 2024, 6 pages of office action and 3 pages of office action translation available.
(Continued)

*Primary Examiner* — Nathan S Taylor
(74) *Attorney, Agent, or Firm* — Nokia Technologies Oy

(57) ABSTRACT

Embodiments of the present disclosure relate to devices, methods, apparatuses and computer readable storage media of signalling enabling Timing Advance (TA) exchange between User Equipment (UE) and Radio Access Network (RAN). The method comprises receiving, at a first device, a TA margin from a second device; transmitting, to the second device, information associated with a reference location of the first device at a first time point; determining a reference TA of the first device at least based on the reference location of the first device; determining an actual TA of the first device at least based on an actual location of the first device at a second time point; and determining, based on a comparison of a TA margin with a difference between the reference TA and the actual TA, whether to transmit an updated reference location of the first device to the second device. In this way, the control for uplink overhead from TA/location updates and probability of impacting downlink scheduling become flexible. Furthermore, the downlink delay can be optimised and meanwhile overhead in case of
(Continued)

very few small packets transmitted can be minimized. As a result, the network can optimize its own performance and the battery savings of the users.

20 Claims, 7 Drawing Sheets

(58) Field of Classification Search
CPC . H04W 28/0865; H04W 28/09; H04W 76/15; H04W 88/06; H04W 56/0045; H04W 56/00; H01L 21/6875; H01L 21/687; H01L 21/027; H01L 21/304; H01L 21/67; H01L 21/683; G03F 7/707; G03F 7/70975; G03F 7/7095; G03F 7/00; G03F 7/20

See application file for complete search history.

(56) References Cited

U.S. PATENT DOCUMENTS

| | | | |
|---|---|---|---|
| 2016/0345316 A1* | 11/2016 | Kazmi | H04W 72/21 |
| 2018/0041868 A1 | 2/2018 | Gunnarsson et al. | |
| 2019/0159156 A1 | 5/2019 | Abedini et al. | |
| 2019/0173633 A1* | 6/2019 | Kwak | H04L 5/0007 |
| 2019/0173655 A1* | 6/2019 | Shimezawa | H04W 56/00 |
| 2019/0200320 A1 | 6/2019 | Selvaganapathy et al. | |
| 2020/0077358 A1 | 3/2020 | Kovacs et al. | |
| 2022/0078841 A1* | 3/2022 | Tiirola | H04W 72/02 |
| 2022/0109532 A1* | 4/2022 | Talarico | H04L 27/0006 |
| 2022/0124795 A1* | 4/2022 | Wu | H04W 56/0045 |
| 2022/0132447 A1* | 4/2022 | Masal | H04L 5/0048 |
| 2022/0232503 A1* | 7/2022 | Cheng | H04W 56/009 |
| 2022/0312481 A1* | 9/2022 | Talarico | H04W 74/0866 |
| 2022/0330187 A1* | 10/2022 | Cheng | H04W 56/004 |
| 2022/0330191 A1* | 10/2022 | Shin | G01S 19/256 |
| 2023/0284165 A1* | 9/2023 | Ye | H04B 7/1851 370/503 |
| 2024/0064677 A1* | 2/2024 | Yan | H04W 56/0015 |
| 2024/0129895 A1* | 4/2024 | Rune | H04W 68/005 |
| 2024/0267862 A1* | 8/2024 | Yan | H04W 56/0045 |

FOREIGN PATENT DOCUMENTS

| | | |
|---|---|---|
| CN | 111565472 A | 8/2020 |
| CN | 111615186 A | 9/2020 |
| CN | 111615215 A | 9/2020 |
| CN | 111867041 A | 10/2020 |
| EP | 1276341 A1 | 1/2003 |
| WO | 2017/134295 A1 | 8/2017 |
| WO | 2020/042107 A1 | 3/2020 |
| WO | 2021/032453 A1 | 2/2021 |

OTHER PUBLICATIONS

"Timing relationship enhancements for NR-NTN", 3GPP TSG RAN WG1 Meeting #102e, R1-2005495, Agenda: 8.4.1, MediaTek Inc., Aug. 24-28, 2020, 6 pages.
"MAC enhancements on the initial access procedures for NTN", 3GPP TSG-RAN WG2 Meeting #111 electronic, R2-2007995, Agenda: 8.10.2.1, ETRI, Aug. 17-28, 2020, 4 pages.
"New Study WID on NB-IoT/eTMC support for NTN", 3GPP TSG RAN Meeting #86, RP-193235, Agenda: xxx, MediaTek Inc, Dec. 9-31, 2019, 4 pages.
"Timing relationship enhancements", 3GPP TSG RAN WG1 #104-e, R1-2101514, Agenda: 8.15.3, Qualcomm Incorporated, Jan. 25-Feb. 5, 2021, pp. 1-5.
International Search Report and Written Opinion received for corresponding Patent Cooperation Treaty Application No. PCT/CN2021/083635, dated Dec. 30, 2021, 9 pages.
"[Draft] LS about location requirements for NTN", 3GPP TSG-RAN WG2 #113-e, R2-2102036, Thales, Jan. 25-Feb. 5, 2021, 2 pages.

\* cited by examiner

SIGNALLING ENABLING TIMING ADVANCE EXCHANGE BETWEEN USER EQUIPMENT AND RADIO ACCESS NETWORK

RELATED APPLICATION

This application was originally filed as PCT Application No. PCT/CN2021/083635, filed on Mar. 29, 2021, which is incorporated herein by reference in its entirety.

FIELD

Embodiments of the present disclosure generally relate to the field of telecommunication and in particular to devices, methods, apparatuses and computer readable storage media of signalling enabling Timing Advance (TA) exchange between User Equipment (UE) and Radio Access Network (RAN).

BACKGROUND

The Third Generation Partnership Project (3GPP) has initiated a study item on the support of the Narrow Band Internet of Things (NB-IoT)/enhanced Machine Type Communication (eMTC) over the Non-Terrestrial Networks (NTNs) in release 17. This study item includes both low-earth orbit and geo-stationary satellites, which leads to round-trip propagation times in the order of 10s to 100s of milliseconds. The objectives of this study item include possible enhancements related to time/frequency adjustment, general timer aspects and mobility.

SUMMARY

In general, example embodiments of the present disclosure provide a solution of signalling enabling TA exchange between UE and RAN.

In a first aspect, there is provided a method. The method comprises receiving, at a first device, a TA margin from a second device; transmitting, to the second device, information associated with a reference location of the first device at a first time point; determining a reference TA of the first device at least based on the reference location of the first device; determining an actual TA of the first device at least based on an actual location of the first device at a second time point; and determining, based on a comparison of a TA margin with a difference between the reference TA and the actual TA, whether to transmit an updated reference location of the first device to the second device.

In a second aspect, there is provided a method. The method comprises receiving, from a first device, information associated with a reference location of the first device at a first time point; determining a reference TA of the first device at least based on the reference location of the first device; and transmitting, to the first device, a TA margin for the first device to determine whether to transmit an updated reference location of the first device to the second device.

In a third aspect, there is provided a first device. The first device comprises at least one processor; and at least one memory including computer program codes; the at least one memory and the computer program codes are configured to, with the at least one processor, cause the first device at least to perform the method according to the first aspect.

In a fourth aspect, there is provided a second device. The second device comprises at least one processor; and at least one memory including computer program codes; the at least one memory and the computer program codes are configured to, with the at least one processor, cause the second device at least to perform the method according to the second aspect.

In a fifth aspect, there is provided an apparatus comprising means for receiving, at a first device, a TA margin from a second device; means for transmitting, to the second device, information associated with a reference location of the first device at a first time point; means for determining a reference TA of the first device at least based on the reference location of the first device; means for determining an actual TA of the first device at least based on an actual location of the first device at a second time point; and means for determining, based on a comparison of a TA margin with a difference between the reference TA and the actual TA, whether to transmit an updated reference location of the first device to the second device.

In a sixth aspect, there is provided an apparatus comprising means for receiving, from a first device, information associated with a reference location of the first device at a first time point; means for determining a reference timing advance, TA, of the first device at least based on the reference location of the first device; and means for transmitting, to the first device, a TA margin for the first device to determine whether to transmit an updated reference location of the first device to the second device.

In a seventh aspect, there is provided a computer readable medium having a computer program stored thereon which, when executed by at least one processor of a device, causes the device to carry out the method according to the first aspect.

In an eighth aspect, there is provided a computer readable medium having a computer program stored thereon which, when executed by at least one processor of a device, causes the device to carry out the method according to the second aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
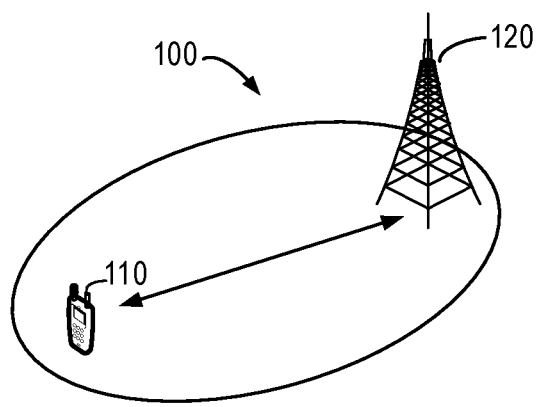
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 may comprise a terminal device 110 (hereinafter may also be referred to as a UE 110 or a first device 110). The communication network 100 may further comprise a network device 120 (hereinafter may also be referred to as a gNB 120 or a second device 120-1). The network device 120-1 can manage a cell 102. The terminal device 110 and the network device 120 can communicate with each other in the coverage of the cell 102.

It is to be understood that the number of network devices and terminal devices shown in FIG. 1 is given for the purpose of illustration without suggesting any limitations. The communication network 100 may include any suitable number of network devices and terminal devices.

A study item on the support of the NB-IoT/eMTC over the NTNs has been initiated in release 17 and the key objectives of the study item may include possible enhancements related to time/frequency adjustment, general timer aspects and mobility. It is assumed that the UE has Global Navigation Satellite System (GNSS) capability. This is for example useful to handle the timing issues caused by the use of half duplex UEs in frequency division duplexing scenario.

Due to the potentially long propagation delays, the network cannot determine which downlink subframes are blocked by the UE due to uplink transmissions. To this end, the UE may report its TA to the network, so that the network and UE are in sync for uplink/downlink scheduling purposes. The TA directly depends on the UE and the satellite locations. It is assumed that the UE can pre-calculate the TA for the random access procedure using its location and satellite ephemeris.

In NTN, the TA between Uplink (UL) and Downlink (DL) frames will be large due to the large round-trip times between UEs and satellite. Furthermore, this TA will vary across UEs and the differences may be in terms of multiple slots. For half-duplex UEs, this results in UE-specific interrupted DL subframes. It is important to consider that the UEs may determine (at least a large portion of) this TA, for example, based on geo-location of itself in relation to the satellite. If the network does not know this TA, this may result in invalid scheduling.

The TA reported from the UE to the network may need to be updated, since the relative position of the satellite with respect to the UE may change over time. However, reporting the UE specific TA when it changes will lead to a lot of overhead and uplink signalling which in itself will cause a loss in link capacity for data traffic.

The present disclosure provides solutions of signalling enabling TA exchange between UE and RAN. In this solution, the UE may receive a TA margin provided by the gNB. The UE may report a reference location of the UE at a first time point. At least based on a further reference location of the UE at a second time point, the UE may determine a reference TA and at least based on an actual location of the UE at a second time point, the UE may determine an actual TA. The UE may compare a difference between the reference TA and the actual TA with the TA margin and determine whether to transmit an updated reference location to the gNB based on the result of the comparison.

Figure 2:
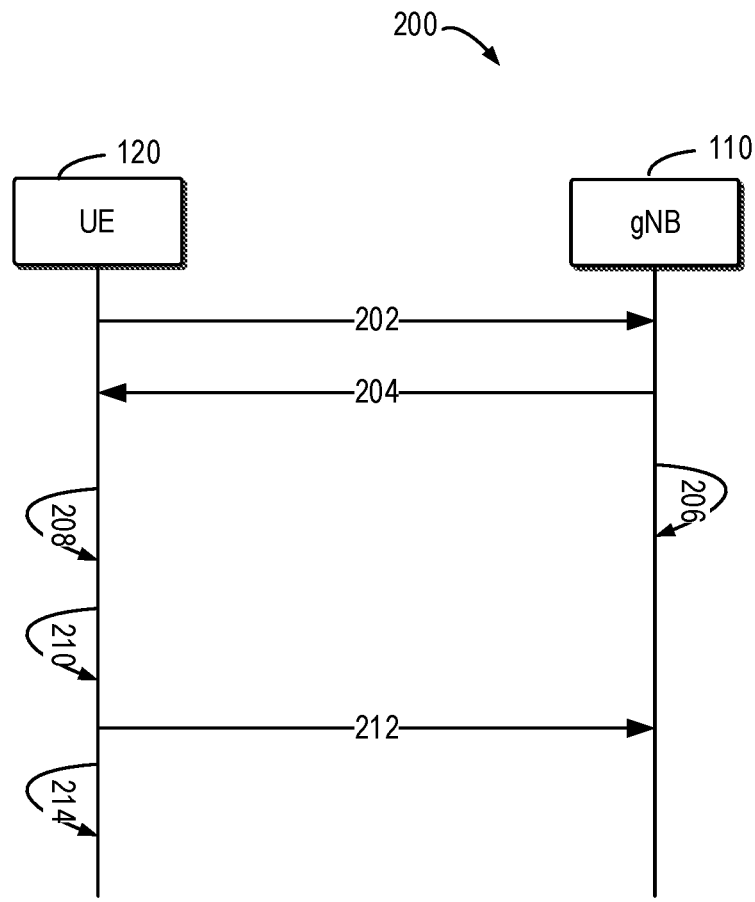
FIG. 2 shows a signaling chart illustrating a process of signalling enabling TA exchange between UE and RAN according to some example embodiments of the present disclosure.

Principle and implementations of the present disclosure will be described in detail below with reference to FIG. 2, which show a schematic process of signalling enabling TA exchange between UE and RAN. For the purpose of discussion, the process 200 will be described with reference to FIG. 1. The process 200 may involve the UE 110 and the gNB 120 as illustrated in FIG. 1.

For the propose of uplink/downlink scheduling synchronization, at a time point for the position exchange T_position_exchange, the UE 110 may report 202 a reference location at the time point for the position exchange T_position_exchange. The reference position can be represented as position "position(T_position_exchange)."

In some example embodiments, the reference position can be referred to as a location of UE 110 in a global navigation satellite system.

Furthermore, the gNB 120 may broadcast one or multiple reference points per cell, where each of the reference point maps to a position within the cell coverage.

For example, for the earth-fixed cells, the reference points remain static during the time the cell coverage is provided to the specific area. Each reference point may be associated with an index such that UE can report it is near index 1 instead of reporting [x,y,z] coordinates.

For earth-moving cells, the reference points may follow the cell's movement. The locations of reference points can be updated via broadcast with a certain periodicity or be linked to satellite ephemeris, such that the UE determines how a reference point location varies as a function of time based on ephemeris. If the UE defines the reference point location based on ephemeris, it may have to report the estimated location.

Therefore, as another option, it is possible that the reference location of UE 110 can be referred to as a reference point position or an index of the reference point. In some example embodiments, at a time point for the position exchange T_position_exchange, the UE may transmit a reference point position (or reference point index) to RAN. The reference point can be selected among reference points broadcasted by the network and the selected reference point can be closest to the actual location of the UE. For example, the selected reference point may have the shortest distance to and UE.

The gNB 120 can provide 204 a TA margin to the UE 110. The TA margin may indicate how accurate the network needs to know the TA. As an option, the gNB 120 may determine the TA by itself based on the capability of the gNB 120 and the capability of the UE 110. It is also possible that the UE 110 may suggest a suitable TA margin to gNB 120.

In some example embodiments, a TA margin can be set from the frame format and related parameter. The bigger margins can be given at the price of more blocked frames. In this way, the trade-off between the blocked frames and signalling overhead can be controlled.

In some example embodiments, the TA margin can be set to a value determined based on a worst case, i.e., a half of Round-Trip Time (RTT) in the cell. The UE can utilize the worst case value to minimize its power consumption.

Furthermore, in a case where the UE 110 reports a reference point position as the reference location of the UE 110 to the gNB 120, As the actual location of the UE 110 is different from reference point position, the TA margin can be set by considering the distance between UE and reference point position.

The UE 110 may determine 208 a reference TA based on the reported reference location and an actual TA based on an actual position of the UE 110.

For example, the reference TA between the UE and a satellite at a time point t can determined based on the Equation (1) as below:

$$\text{reference TA}(t)=\text{TA}(\text{reported\_position},\text{satellite position}(t)) \quad (1)$$

where t=0: T_TA_precalculation; reported_position may represent the position reported to RAN; the satellite position (t) may represent the position of the satellite of the serving cell served through at time point t; TA ( ..., ... ) may represent the simple calculation of the delay between satellite and the UE based on the included components. To get the full TA, the feeder link may need to be added.

Similarly, the UE may calculate the actual TA between the UE and a satellite at a time point t based on the Equation (2) as below:

$$\text{actual TA}(t)=\text{TA}(\text{actual position}(t),\text{satellite position}(t)) \quad (2)$$

where the actual location (t) may represent the actual location of the UE 110 at time point t and the satellite position(t) may represent the position of the satellite of the serving cell served through at time point t; TA ( ..., ... ) may represent the simple calculation of the delay between satellite and the UE based on the included components. To get the full TA, the feeder link may need to be added.

After receiving the reference location position(T_position_exchange) reported from the UE at the time point T_position_exchange, the gNB 120 may also determine 206 a reference TA at the time point t based on the reported reference location transmitted from the UE 110. The gNB 120 may assume the reference TA is used by the UE 110.

After determining the reference TA and the actual TA, the UE 110 may determine a difference between the reference TA and the actual TA and compare 210 the difference with the TA margin provided by the gNB 120, to determine whether an updated reference location of UE 110 is to be transmitted to the gNB 120.

In some example embodiments, if the UE 110 determines that the difference between the reference TA and the actual TA exceeds the TA margin, the UE 110 may transmit 212 an updated reference location to the gNB 120. Because the previous reported location may not be accurately, or the UE has been moved to other places which may distance from the previously reported reference location.

In some example embodiments, if the UE 110 determines that the difference between the reference TA and the actual TA exceeds the TA margin, the UE 110 may require a large TA margin. For example, the UE 110 may transmit a request for a further TA margin to the gNB 120.

In some example embodiments, if the UE 110 determines that the difference between the reference TA and the actual TA fails to exceed the TA margin, the UE 110 may not need to transmit updated reference location to the gNB 120. The UE 110 may wait a scheduling from the gNB 120 determined based on the reference TA that is calculated by the gNB 120 based on the reported reference location. That is, the transmission synchronization between the gNB 120 and the UE 110 can depend on the reference TA.

In some example embodiments, if the UE 110 determines that the difference between the reference TA and the actual TA fails to exceed the TA margin, the UE 110 may switch 214 to a sleep mode for a while, which is determined based on the difference between the reference TA and the actual TA. Because the UE 110 knows that it will not be scheduled in this time period.

Figure 3A:
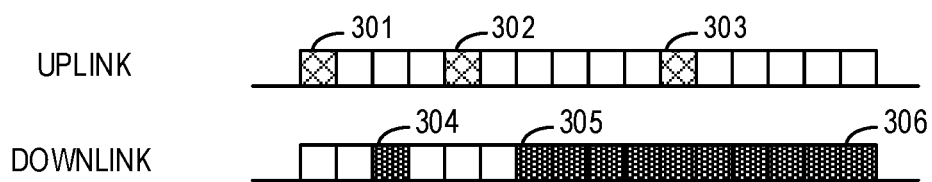
FIGS. 3A-3C shows examples of impact cause by a small TA margin and a large TA margin according to some example embodiments of the present disclosure.
Figure 3B:
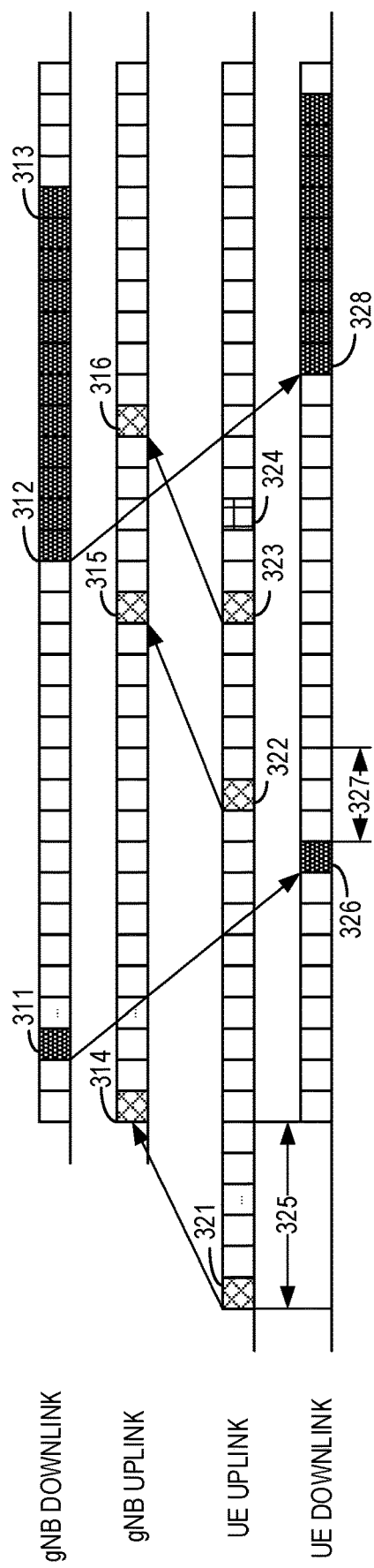
Figure 3C:
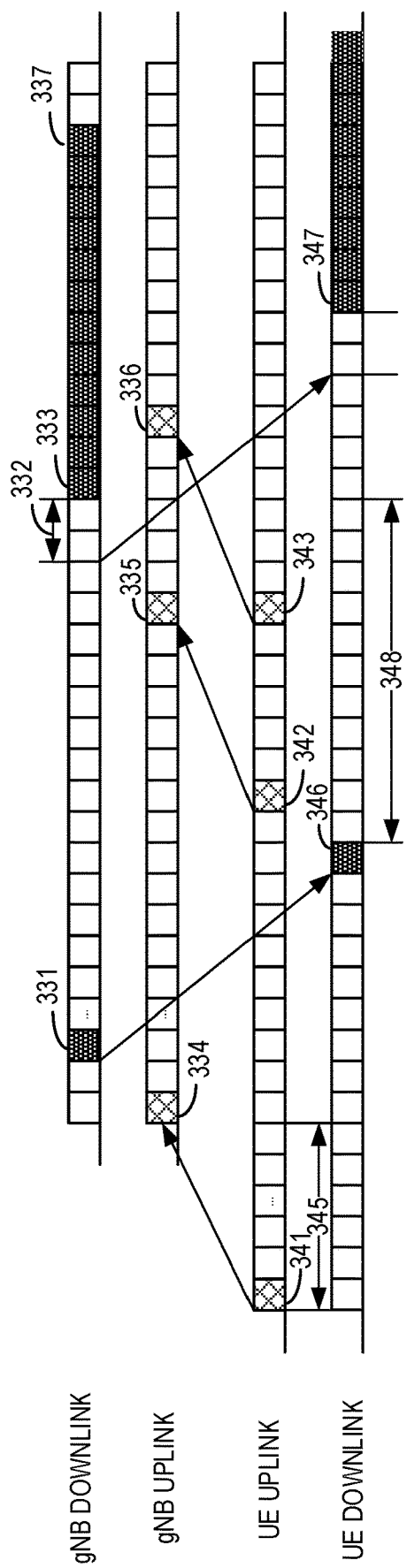

FIGS. 3A-3C shows examples of impact cause by a small TA margin and a large TA margin according to some example embodiments of the present disclosure. With reference to FIGS. 3A-3C, the impact on the signalling overhead caused by TA margin (the blocked frames) can be explained.

In FIG. 3A, the uplink frames of the UE can be represented by frames 301, 302 and 303, and the downlink frames transmitted from the gNB can be represented by frame 304 and a set of frames from 305 to 306. The time between the packets may depend on arrival of previous packet. However, it can be seen from FIG. 3A that the uplink sends request for more data while the downlink data is ongoing.

With reference to FIGS. 3B and 3C, the scheduling uplink and downlink frames for a UE and the network timing can be seen, where in FIG. 3B a small TA Margin is used and in FIG. 3C a large TA Margin is used. The UE refers to a Half-Duplex UE, which means that the UE can first receive data 1 frame later after sending uplink data.

As shown in FIG. 3B, the initial access by the UE in the frame 321 (corresponding to the uplink frame 301 shown in FIG. 3A) happens. The UE initiate the uplink transmission depends on a half of the TA (interval 325). Then the network replies with a downlink frame 311 (corresponding to the downlink frame 304 shown in FIG. 3A). The UE receives the downlink data in frame 326.

The UE may further request more data in frame 322 (corresponding to the uplink frame 302 shown in FIG. 3A) and the gNB receives the uplink data in frame 315. Then a large amount of data can be sent in the downlink frames (from frame 312 to frame 313, corresponding to the downlink frames from 305 to frame 306 shown in FIG. 3A).

During the downlink data transmission, an uplink transmission (in frame 323, which is corresponding to the uplink frame 303 shown in FIG. 3A) happens, which can be scheduled by the network. This can be an RLC ACK, L1 ACK or UL user data.

In case of a small TA Margin (as shown in FIG. 3B), the UE sends a location update (in frame 324), but it happens at a time where there is no impact on the downlink data.

As shown in FIG. 3C, the initial access by the UE in the frame 341 (corresponding to the uplink frame 301 shown in FIG. 3A) happens. The UE initiate the uplink transmission depends on a half of the TA (interval 345). Then the network replies with a downlink frame 331 (corresponding to the downlink frame 304 shown in FIG. 3A). The UE receives the downlink data in frame 346.

The UE may further request more data in frame 342 (corresponding to the uplink frame 302 shown in FIG. 3A) and the gNB receives the uplink data in frame 335. Then a large amount of data can be sent in the downlink frames (from frame 333 to frame 337, corresponding to the downlink frames from 305 to frame 306 shown in FIG. 3A).

During the downlink data transmission, an uplink transmission (in frame 343, which is corresponding to the uplink frame 303 shown in FIG. 3A) happens, which can be scheduled by the network. This can be an RLC ACK, L1 ACK or UL user data.

Assuming the network knows the TA of the UE with accuracy of TA Margin, it needs to reserve 1+TAMargin frames and avoid scheduling in those frames. If TA Margin (shown with an interval 327) is small (as shown in FIG. 3B), there is no impact on the downlink. If on the contrary the TA margin (shown with an interval 348) is large (as shown in FIG. 3C), the network will need to reserve more frames and the downlink data is postponed 2 frames (shown with an interval 332). This setting has the advantage that the UE does not need to execute many uplink updates about the changing TA.

In this way, the control for uplink overhead from TA/location updates and probability of impacting downlink scheduling become flexible. Furthermore, the downlink delay can be optimised and meanwhile overhead in case of very few small packets transmitted can be minimized. As a result, the network can optimize its own performance and the battery savings of the users.

Figure 4:
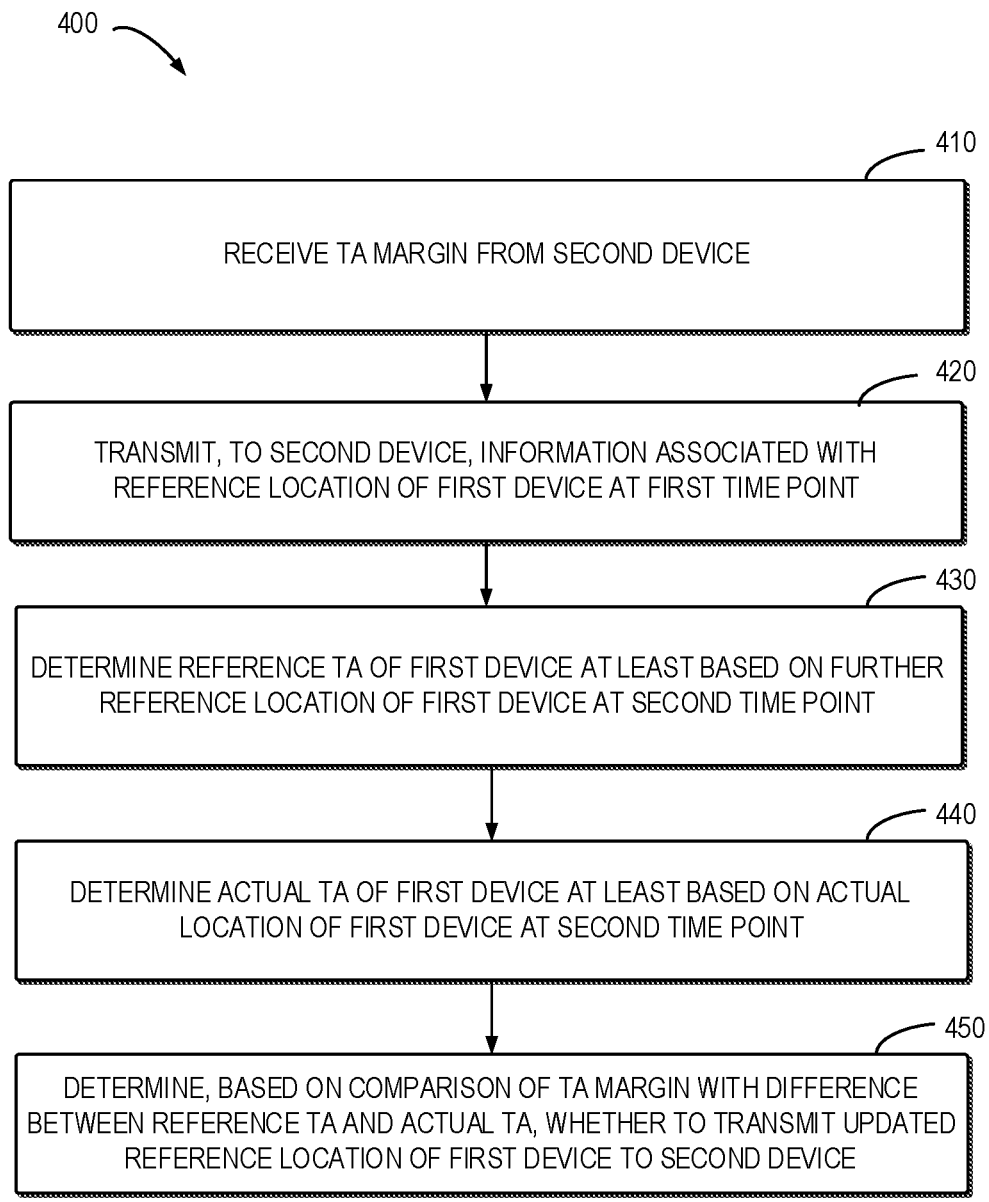
FIG. 4 shows a flowchart of an example method of signalling enabling TA exchange between UE and RAN according to some example embodiments of the present disclosure.

FIG. 4 shows a flowchart of an example method 400 of signalling enabling TA exchange between UE and RAN according to some example embodiments of the present disclosure. The method 400 can be implemented at the first device 110 as shown in FIG. 1. For the purpose of discussion, the method 400 will be described with reference to FIG. 1.

At 410, the first device receives a TA margin from a second device.

In some example embodiments, the TA margin is set by a frame format.

In some example embodiments, the TA margin is set based on a round trip time between the first device and the second device.

At 420, the first device transmits, to the second device, information associated with a reference location of the first device at a first time point.

In some example embodiments, the reference location comprises a location of the first device indicated in a global navigation satellite system or at least one reference point of a cell associated with the first device.

In some example embodiments, the first device may receive, from the second device, broadcast of one or more reference points of the cell. Each of one or more reference points maps to a position within a coverage of the cell.

At 430, the first device determines a reference TA of the first device at least based on the reference location of the first device.

In some example embodiments, the first device may determine the reference TA based on a satellite position associated with a serving cell of the first device at the second time point and the reference location of the first device.

At 440, the first device determines an actual TA of the first device at least based on an actual location of the first device at the second time point.

In some example embodiments, the first device may determine the actual TA based on a satellite position associated with a serving cell of the first device at the second time point and the actual location of the first device at the second time point.

At 450, the first device determines whether to transmit the updated reference location of the first device to the second device.

In some example embodiments, if the first device determines that the difference between the reference TA and the actual TA exceeds the TA margin, the first device may transmit the updated reference location of the first device to the second device.

In some example embodiments, the first device may transmit, to the second device, a request for a further TA margin, the further TA margin being larger than the received TA margin.

In some example embodiments, if the first device determines that the difference between the reference TA and the actual TA fails to exceed the TA margin, the first device may switch to a sleep mode for a time period determined based on the difference between the reference TA and the actual TA.

In some example embodiments, the first device comprises a terminal device and the second device comprises a network device.

Figure 5:
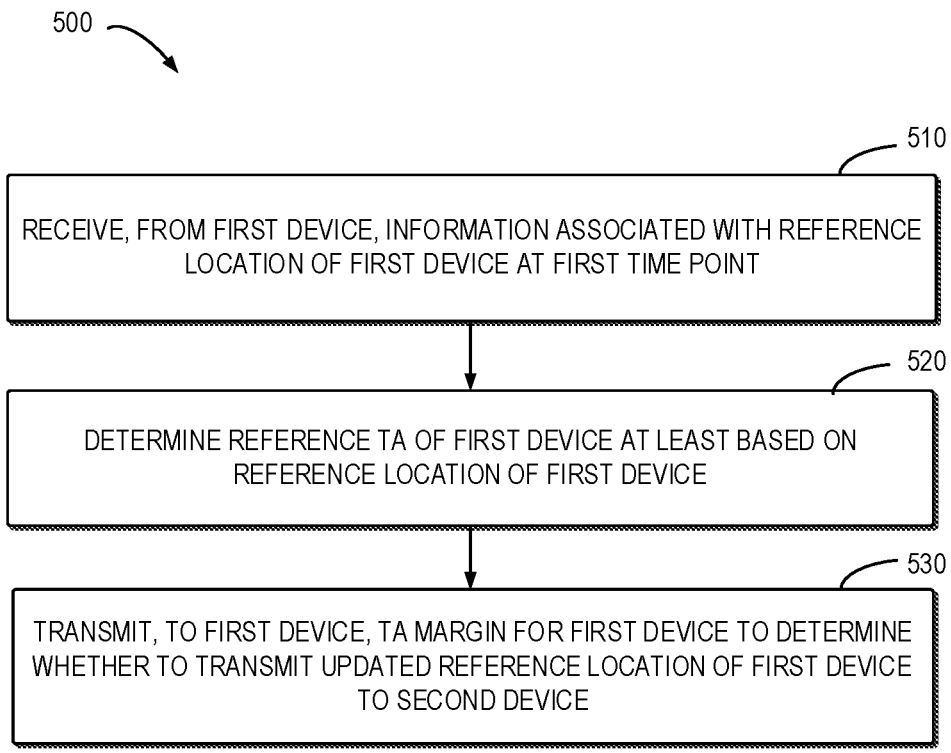
FIG. 5 shows a flowchart of an example method of signalling enabling TA exchange between UE and RAN according to some example embodiments of the present disclosure.

FIG. 5 shows a flowchart of an example method 500 of signalling enabling TA exchange between UE and RAN according to some example embodiments of the present disclosure. The method 500 can be implemented at the second device 120 as shown in FIG. 1. For the purpose of discussion, the method 500 will be described with reference to FIG. 1.

At 510, the second device receive, from a first device, information associated with a reference location of the first device at a first time point.

In some example embodiments, the reference location comprises a location of the first device indicated in a global navigation satellite system or at least one reference point of a cell associated with the first device.

In some example embodiments, the second device may transmit, to the first device, broadcast of one or more reference points of the cell. Each of one or more reference points maps to a position within a coverage of the cell.

At 520, the second device determines a reference TA of the first device at least based on the reference location of the first device.

In some example embodiments, the second device may determine the reference TA based on a satellite position associated with a serving cell of the first device at the second time point and the reference location of the first device.

At 530, the second device transmits, to the first device, a TA margin for the first device to determine whether to transmit an updated reference location of the first device to the second device.

In some example embodiments, the second device may receive, from the first device, the updated reference location of the first device and determine a further reference TA based on the updated reference location.

In some example embodiments, the second device may receive, from the first device, a request for a further TA margin, the further TA margin being larger than the TA margin.

In some example embodiments, the first device comprises a terminal device and the second device comprises a network device.

In some example embodiments, an apparatus capable of performing the method 400 (for example, implemented at the UE 110) may comprise means for performing the respective steps of the method 400. The means may be implemented in any suitable form. For example, the means may be implemented in a circuitry or software module.

In some example embodiments, the apparatus comprises means for receiving, at a first device, a TA margin from a second device; means for transmitting, to the second device, information associated with a reference location of the first device at a first time point; means for determining a reference timing advance, TA, of the first device at least based on a further reference location of the first device at a second time point; means for determining an actual TA of the first device at least based on an actual location of the first device at the second time point; and means for determining, based on a comparison of a TA margin with a difference between the reference TA and the actual TA, whether to transmit an updated reference location of the first device to the second device.

In some example embodiments, an apparatus capable of performing the method 500 (for example, implemented at the gNB 120) may comprise means for performing the respective steps of the method 500. The means may be implemented in any suitable form. For example, the means may be implemented in a circuitry or software module.

In some example embodiments, the apparatus comprises means for receiving, from a first device, information associated with a reference location of the first device at a first time point; means for determining a reference timing advance, TA, of the first device at least based on the reference location of the first device; and means for transmitting, to the first device, a TA margin for the first device to determine whether to transmit an updated reference location of the first device to the second device.

Figure 6:
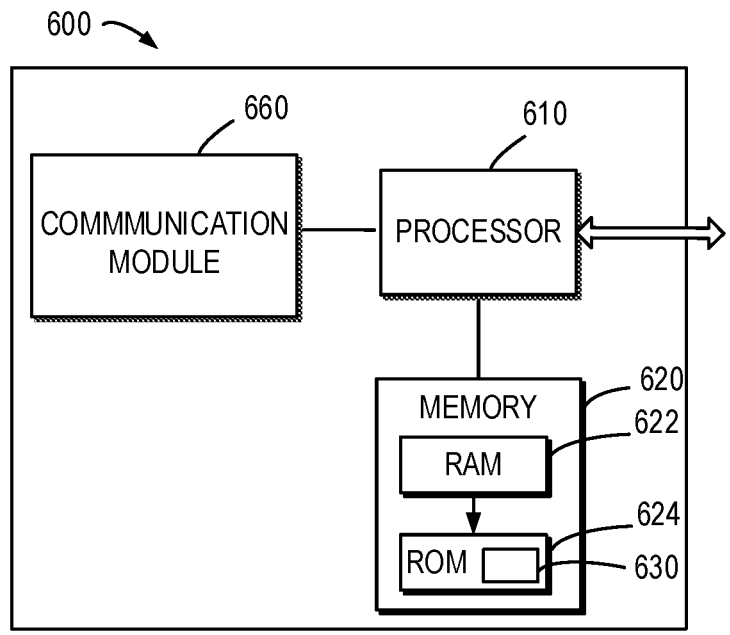
FIG. 6 shows a simplified block diagram of a device that is suitable for implementing example embodiments of the present disclosure.

FIG. 6 is a simplified block diagram of a device 600 that is suitable for implementing embodiments of the present disclosure. The device 600 may be provided to implement the communication device, for example the UE 110 and the gNB 120 as shown in FIG. 1. As shown, the device 600 includes one or more processors 610, one or more memories 640 coupled to the processor 610, and one or more transmitters and/or receivers (TX/RX) 640 coupled to the processor 610.

The TX/RX 640 is for bidirectional communications. The TX/RX 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 620. The processor 610 may perform any suitable actions and processing by loading the program 630 into the RAM 620.

The embodiments of the present disclosure may be implemented by means of the program 630 so that the device 600 may perform any process of the disclosure as discussed with reference to FIGS. 2 to 5. The embodiments of the present disclosure may also be implemented by hardware or by a combination of software and hardware.

Figure 7:
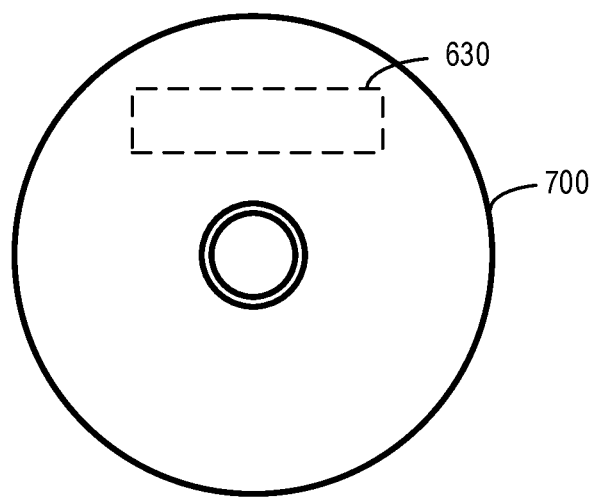
FIG. 7 shows a block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400-500 as described above with reference to FIGS. 4-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
   at least one processor; and
   at least one memory storing instructions that, when executed by the at least one processor, cause the apparatus at least to:
   receive a timing advance margin from a second device;
   transmitting, to the second device, information associated with a reference location of the apparatus at a first time point;
   determine a reference timing advance of the apparatus at least based on the reference location of the apparatus;
   determine an actual timing advance of the apparatus at least based on an actual location of the apparatus at a second time point; and
   determine, based on a comparison of the timing advance margin with a difference between the reference timing advance and the actual timing advance, whether to transmit an updated reference location of the apparatus to the second device.

2. The apparatus of claim 1, wherein the reference location comprises at least one of the following:
   a location of the apparatus indicated in a global navigation satellite system, or
   at least one reference point of a cell associated with the apparatus.

3. The apparatus of claim 2, wherein the apparatus is caused to:
   receive, from the second device, at least one broadcast of one or more reference points of the cell, wherein each of one or more reference points maps to a position within a coverage of the cell.

4. The apparatus of claim 1, wherein determining the reference timing advance comprises:
   determine the reference timing advance based on a satellite position associated with a serving cell of the apparatus at the second time point and the reference location of the apparatus.

5. The apparatus of claim 1, wherein determining the actual timing advance comprises:
   determine the actual timing advance based on a satellite position associated with a serving cell of the apparatus at the second time point and the actual location of the apparatus at the second time point.

6. The apparatus of claim 1, wherein the timing advance margin is set by a frame format.

7. The apparatus of claim 1, wherein the timing advance margin is set based on a round trip time between the apparatus and the second device.

8. The apparatus of claim 1, wherein determining whether to transmit the updated reference location of the apparatus comprises:
   in accordance with a determination that the difference between the reference timing advance and the actual timing advance exceeds the timing advance margin, transmit the updated reference location of the apparatus to the second device.

9. The apparatus of claim 8, wherein the apparatus is caused to:
   transmit, to the second device, a request for a further timing advance margin, the further timing advance margin being larger than the received timing advance margin.

10. The apparatus of claim 1, wherein determining whether to transmit the updated reference location of the apparatus comprises:
    in accordance with a determination that the difference between the reference timing advance and the actual timing advance fails to exceed the timing advance margin, switch to a sleep mode for a time period determined based on the difference between the reference timing advance and the actual timing advance.

11. The apparatus of claim 1, wherein the apparatus comprises a terminal device and the second device comprises a network device.

12. An apparatus comprising:
    at least one processor; and
    at least one memory storing instructions that, when executed by the at least one processor, cause the apparatus at least to:
    receive, from a first device, information associated with a reference location of the first device at a first time point;

determine a reference timing advance of the first device at least based on the reference location of the first device and further based on a satellite position associated with a serving cell of the first device at a second time point; and transmit, to the first device, a timing advance margin.

13. The apparatus of claim 12, wherein the reference location comprises at least one of the following:

a location of the first device indicated in a global navigation satellite system, or a reference point of a cell associated with the first device.

14. The apparatus of claim 13, wherein the apparatus is caused to:

transmit, to the first device, at least one broadcast of one or more reference points of the cell, wherein each of one or more reference points maps to a position within a coverage of the cell.

15. The apparatus of claim 12, wherein the apparatus is caused to:

receive, from the first device, the updated reference location of the first device; and determine a further reference timing advance based on the updated reference location.

16. The apparatus of claim 12, wherein the apparatus is caused to:

receiving, from the first device, a request for a further timing advance margin, the further timing advance margin being larger than the transmitted timing advance margin.

17. The apparatus of claim 12, wherein the first device comprises a terminal device and the apparatus comprises a network device.

18. A method comprising:

receiving, at a first device, a timing advance margin from a second device;

transmitting, to the second device, information associated with a reference location of the first device at a first time point;

determining a reference timing advance of the first device at least based on the reference location of the first device;

determining an actual timing advance of the first device at least based on an actual location of the first device at a second time point; and determining, based on a comparison of the timing advance margin with a difference between the reference timing advance and the actual timing advance, whether to transmit an updated reference location of the first device to the second device.

19. The method of claim 18, wherein the reference location comprises at least one of the following:

a location of the first device indicated in a global navigation satellite system, or at least one reference point of a cell associated with the first device.

20. The method of claim 18, further comprising:

receiving, from the second device, at least one broadcast of one or more reference points of the cell, wherein each of one or more reference points maps to a position within a coverage of the cell.

* * * * *